July 9, 1929.  N. D. PRESTON  1,720,635
SPEED INDICATING MEANS FOR CARS
Filed Jan. 4, 1927
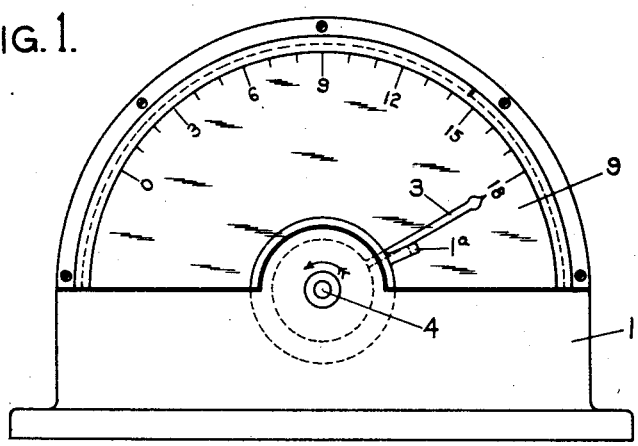
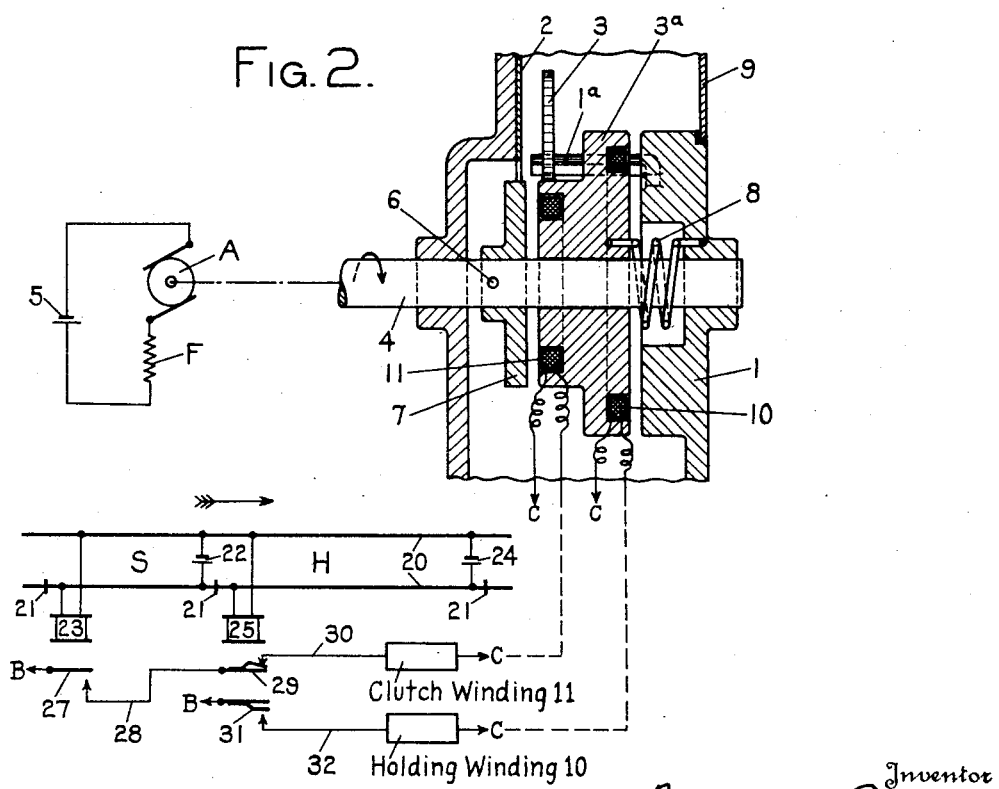
Inventor
Neil D. Preston Patented July 9, 1929.

1,720,635

UNITED STATES PATENT OFFICE.

NEIL D. PRESTON, OF ROCHESTER, NEW YORK, ASSIGNOR TO GENERAL RAILWAY SIGNAL COMPANY, OF ROCHESTER, NEW YORK.

SPEED-INDICATING MEANS FOR CARS.

Application filed January 4, 1927. Serial No. 159,012.

This invention relates to speed indicating means, and more particularly to means for indicating at a suitable place on the ground the speed of a free running railway car moving on a track.

In railway car classification systems, cars are accelerated by suitable means, such as by running them off of a hump or hill, are then directed into suitable classification tracks by means of track switches, and are then retarded by suitable means to prevent them from striking other cars on such tracks by excessive impact. In systems of this kind it is desirable to know at what speed the various cars are travelling, at least when they move through certain sections of the classification system, and more particularly it is desirable to know when a car has been accelerated to the desired speed for classifying purposes.

In accordance with the present invention it is proposed to determine the speed of a free running car by employing suitable means which responds to the time taken for the car to travel through a section of predetermined length. In other words, it is proposed to indicate the speed of a free running car by the time-distance interval principle.

Another object of the present invention resides in the provision of means for storing the speed indication given for a short interval of time so that this indication may be observed, or its value taken advantage of by suitable automatic means.

Other objects, purposes and characteristic features of the present invention will appear as the description progresses.

In describing the invention in detail reference will be made to the accompanying drawings in which:—

Fig. 1 shows a front view of a speed indicator embodying the present invention; and Fig. 2 is an enlarged sectional side elevation of the device shown in Fig. 1, with a portion of the casing and portions of the movable mechanism broken away to illustrate the invention more clearly, and with the time controlled driving means and the trackway means shown conventionally.

Referring to Fig. 1, the speed indicator as a whole comprises a casing 1 having the upper portion of its front wall cut away so as to expose the dial 2, over which the indicating pointer 3 may move, this cut away portion of the front wall being preferably covered by a suitable transparent cover 9.

Pivotally mounted in this casing 1, is a time-controlled shaft 4, which is preferably driven by suitable clock-work mechanism, or other constant speed driving means; and in the particular arrangement shown, this timing shaft 4 is driven by a constant speed electric motor, having an armature A and a field winding F, through suitable reduction gearing (not shown). This motor is preferably driven by a constant voltage source of electricity such as the battery 5.

To this timing shaft 4 is suitably fastened, as by pin 6, a flange or plate 7. A pointer or indicator 3 terminates in an enlarged hub portion $3^a$ which is pivotally mounted on the shaft 4 between the flange 7 and the front wall of the casing 1. The front wall of the casing 1 is provided with a backwardly extending ear $1^a$, which serves as a stop for limiting the movement of the indicator 3 in a clockwise direction, a coil spring 8 having its one end fastened in the front wall of the casing 1 and having its other end secured in the hub portion $3^a$ of the indicator 3, so that this indicator 3 is urged in a clockwise direction and normally against the stop $1^a$ by the tension of the spring 8.

The end wall of the casing 1, the hub portion $3^a$ containing the indicator 3, and the flange 7 secured to the shaft 4 are all made of magnetic material, such as soft iron either laminated or solid. This hub $3^a$ has circumferential grooves cut therein from the two side faces thereof, which grooves in the particular arrangement shown are of different diameters, and each groove contains a winding encircling the shaft 4.

If the larger or holding winding 10 is energized, the hub portion $3^a$ of the indicator will be attracted toward the side wall of the casing 1, and will cause this hub portion to magnetically grip the side wall of the casing; whereas if the smaller or clutch winding 11 is energized, this hub portion $3^a$ will be attracted toward the soft iron flange 7 and thereby cause the indicator to be frictionally fixed to the shaft 4 and rotate therewith.

At that point along the railway track at which it is desired to determine the speed of free running cars, the track is provided with suitable means for energizing the clutch winding 11 for a distance of movement of a car and then energize the holding winding and de-energize the clutch winding for another distance of movement, so that the indicator 3 when the car in question enters the section is caused to move with the slow running shaft and this indicator is clutched or held against the wall of the casing at the moment the car has passed out of such section. Consequently if the indicator moves with the timing shaft while the car is in such section this indicator definitely indicates the time while the first car wheels were in such section, and since the length of this section is a fixed value, the dial may be calibrated to indicate speed directly. The speed indicated may be read by the operator or attendant or may be used in connection with suitable automatic apparatus, the operation of which requires the speed of the car to be taken into consideration.

In the particular arrangement shown, one of the track rails 20 is provided with insulating joints 21 to divide this trackway into sections, although these insulated sections may have both of the rails insulated. The speed indicating section S in the particular arrangement shown is provided with a track circuit, including a track battery 22 and a track relay 23, whereas the holding section H is provided with a track circuit consisting of a track battery 24 and a track relay 25. The track relays 23 and 25 are of course energized when there are no cars moving through these sections, so that the windings 10 and 11 of the speed indicator, which include back contacts of these relays, are normally de-energized and the pointer 3 is normally held against the stop 1$^a$ by the spring 8 as shown in the drawings.

*Operation.*—Cars are intended to move from left to right as indicated by the direction of the arrow. The shaft 4 is rotating at low but constant and fixed speed in a counter-clockwise direction, as viewed and as shown by the arrow, in Fig. 1 of the drawings. As the first wheels and axle of the car in question enter the speed indicating section S, the track relay 23 is shunted and closes its back contact 27, thereby completing the following circuit for the clutch winding 11:—beginning at the terminal B of a suitable source of energy, back contact 27 of the track relay 23, wire 28, front contact 29 of the track relay 25, wire 30, clutch winding 11, to the common return wire C connected to the other side of said source of energy. The completion of this circuit causes the hub portion 3$^a$ to attract the soft iron flange 7, thereby causing the indicator 3 to move with the shaft 4. It is of course noted that the faster the car travels in the section S the less distance the indicator 3 will move over its dial and that by reason of this fact (see dial of Fig. 1) the indication given will be highest when the time the front axle of the car occupies the section S is the shortest, and for this reason the indicator normally assumes its maximum speed position. The indications engraved on the dial 2 of the speed indicator are so selected, that is, the dial is so calibrated as to show the average speed of the car while moving through the section S in miles per hour. In other words, although the indicator primarily indicates time the dial over which it moves is calibrated to directly indicate speed in miles per hour.

When the car enters the holding section H the track relay 25 is shunted by this car axle, opening its front contact 29 and closing its back contact 31. The contacts 29 and 31 of the relay 25 are so constructed that both of them cannot be open at the same time, that is, the contacts 29 and 31 are of the make-before-break type. The contact 31 energizes the holding winding through the following circuit: beginning at the terminal B, contact 31, wire 32, holding winding 10, common return wire C; and this occurs before the circuit for the clutch winding 11 is broken at the contact 29. The clutch member 3$^a$ is quickly shifted from its engagement with the clutch portion 7 into engagement with the side wall of the casing 1, and the indicator 3 is held in the position to which it moved while the car occupied the speed section S of the trackway. The indicator is held in this position so long as the section H remains occupied.

The present invention may be conveniently analyzed by observing that the speed indicator is primarily a time indicator and indicates the time that a car occupied a certain section of trackway, and that by reason of the fact that both time and distance are direct factors in determining the speed of the train, if the distance is a constant the time indicating device may be calibrated so as to indicate speed directly.

Having thus shown and described only one rather specific embodiment of the present invention this specific illustration should not be construed as an illustration of the scope of the invention or as an illustration of the preferred specific construction thereof; and it is desired to be understood that various additions, changes and modifications may be made to adapt the invention to the particular form of car classification system, or suitable automatic apparatus used in such systems, all without departing from the scope of the invention or the idea of means underlying the same.

What I desire to secure by Letters Patent is:—

1. In combination, a railway track having two adjacent sections divided from the rest of the track by insulating joints, a track circuit for each section each having a track relay, an indicator movable over a dial, a rotatable shaft rotated at a uniform rate, and a circuit for fastening said indicator to said shaft closed only so long as one of said relays is de-energized and the other of said relays is energized.

2. In combination, a railway track having two adjacent sections divided from the rest of the track by insulating joints, a track circuit for each section each having a track relay, an indicator movable over a dial, a rotatable shaft rotated at a uniform rate, means for connecting said indicator to said shaft when the track relay of one section is de-energized, and means for holding said indicator in the position it then assumes when the other track relay is de-energized.

3. In combination, a railway track having two adjacent sections divided from the rest of the track by insulating joints, a track circuit for each section each having a track relay, an indicator having a normal biased position movable over a dial, a rotatable shaft rotated at a uniform rate for at times moving said indicator, and means for allowing said indicator to be moved to the normal position when both of said relays are energized.

4. A speed indicator functioning on the time-distance interval principle comprising, a shaft rotated at a slow uniform rate of speed, a hub on said shaft biased in a direction against the rotation of said shaft, electro-magnetic means including a circuit which if energized clutches said indicator to said shaft, other electro-magnetic means including a circuit which if energized holds said indicator in the position which it has then assumed, and means for controlling the energization of said circuits.

5. In a speed indicator for indicating the speed of railway cars at a stationary point along the railway track, the combination with a railway track having a section of definite length, a speed indicator comprising a shaft driven at a constant speed, an indicator loosely on said shaft biased to an extreme position, electro-magnetic means for at times fastening said indicator to said shaft, another electro-magnetic means for holding said indicator in the indicating position it then assumes, and means controlling said two electro-magnetic means so that said indicator is fastened to said shaft from the time a car enters said section until it leaves said section and is held stationary in its then position for a time after such car leaves said section.

In testimony whereof I affix my signature.

NEIL D. PRESTON.